(12) United States Patent
Brunner et al.

(10) Patent No.: US 9,403,312 B2
(45) Date of Patent: Aug. 2, 2016

(54) BLOW MOULDING MACHINE WITH COOLANT SUPPLY CAPABLE OF BEING HEATED

(71) Applicant: KRONES AG, Neutraubling (DE)

(72) Inventors: Andreas Brunner, Aufhausen (DE); Thomas Hoellriegl, Teublitz (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/529,751

(22) Filed: Oct. 31, 2014

(65) Prior Publication Data

US 2015/0151480 A1 Jun. 4, 2015

(30) Foreign Application Priority Data

Dec. 2, 2013 (DE) .......................... 10 2013 113 335

(51) Int. Cl.
| | |
|---|---|
| *B29C 49/46* | (2006.01) |
| *B29C 49/48* | (2006.01) |
| *B29C 49/28* | (2006.01) |
| B29C 49/06 | (2006.01) |
| B29C 49/12 | (2006.01) |
| B29C 49/36 | (2006.01) |

(52) U.S. Cl.
CPC ............. *B29C 49/4823* (2013.01); *B29C 49/28* (2013.01); *B29C 49/46* (2013.01); (Continued)

(58) Field of Classification Search
CPC ............ B29C 49/46; B29C 2049/4828; B29C 2049/4697; B29C 2049/4841
USPC .......................................................... 249/79
See application file for complete search history.

(56) References Cited

U.S. PATENT DOCUMENTS

| | | | | |
|---|---|---|---|---|
| 4,367,785 A | * | 1/1983 | Allen ...................... | F28F 27/00 137/14 |
| 8,579,622 B2 | * | 11/2013 | Hoellriegl ............... | B29C 49/78 425/144 |

(Continued)

FOREIGN PATENT DOCUMENTS

| | | |
|---|---|---|
| DE | 102009005142 A1 | 7/2010 |
| DE | 102011080833 A1 | 2/2013 |
| DE | 102012104267 A1 | 11/2013 |

OTHER PUBLICATIONS

German Search Report dated Nov. 14, 2014.

(Continued)

*Primary Examiner* — Robert B Davis
(74) *Attorney, Agent, or Firm* — Kratz, Quintos & Hanson, LLP (57) ABSTRACT

An apparatus (1) for the shaping of plastics material pre-forms (10) into plastics material containers (10*a*), with at least one shaping station (8) which has a blow molding device (4) which forms a cavity, inside which the plastics material pre-forms (10) are capable of being shaped into the plastics material containers (10*a*) by being acted upon with a gaseous medium, wherein the blow molding device (4) is constructed in several parts and has at least one first blow mold part (4*a*) and one second blow mold part (4*b*), and wherein the shaping station (8) has a blow mold carrier device (6) for holding the blow mold parts (4*a*, 4*b*), wherein the blow mold carrier device (6) has a first carrier part (6*a*) and a second carrier part (6*b*) which are movable with respect to each other in order to open and close the blow molding device (4), and wherein at least one coolant channel (7) is provided which is used for conveying a flowable coolant for cooling the blow molding device (4) and/or the blow mold carrier device (6), wherein this coolant channel (7) is integrated in a cooling circuit (60), wherein the apparatus (1) has a clean room (20) inside which the plastics material pre-forms (10) are capable of being expanded to form the plastics material containers (10*a*). According to the invention the cooling circuit (60) has at least one heating element (80) capable of being switched on for heating the flowable coolant.

20 Claims, 2 Drawing Sheets

(52) U.S. Cl.
CPC ............... *B29C 49/06* (2013.01); *B29C 49/12* (2013.01); *B29C 49/36* (2013.01); *B29C 2049/4697* (2013.01); *B29C 2049/4828* (2013.01); *B29C 2049/4841* (2013.01)

(56) References Cited

U.S. PATENT DOCUMENTS

2011/0311675 A1* 12/2011 Voth .................. B29C 49/42
 425/526
2012/0248659 A1* 10/2012 Neubauer ............... B29C 49/46
 264/523
2013/0037996 A1* 2/2013 Fuhrer .................... B29C 49/46
 264/523

OTHER PUBLICATIONS

European Search Report in EP application 14195804 .1 dated May 12, 2015.

* cited by examiner

BLOW MOULDING MACHINE WITH COOLANT SUPPLY CAPABLE OF BEING HEATED

The present invention relates to an apparatus and a method of shaping plastics material pre-forms into plastics material containers. Apparatus of this type and corresponding methods have long been known from the prior art. In this case it is usual for heated plastics material pre-forms to be supplied to blow moulding stations and to be expanded there to form plastic bottles by means of compressed air. These shaping stations are also usually arranged on a movable carrier.

In recent years, so-called sterile blow moulding machines have also become known. In this case the plastics material pre-forms are conveyed through a clean room during their expansion. In this way it is possible to facilitate the production of sterile beverages or beverages to be filled sterile respectively. In order to maintain clean rooms of this type, however, it is necessary from time to time to sterilize components of the plant, and in particular also elements of these individual shaping stations. In this case the components, and in particular the surfaces thereof, are sterilized with a sterilization medium, in particular but not exclusively with (in particular heated) hydrogen peroxide gas ($H_2O_2$) or peracetic acid.

In order to prevent condensation of this sterilization agent, in particular $H_2O_2$, a specific surface temperature of the components to be sterilized has to be reached or maintained respectively in this case. This temperature is in an order of magnitude of 50° in this case. For this purpose the clean rooms as well as the mould carriers of the shaping stations are heated in the prior art with hot air which is supplied through an aeration technology of the machine.

With this procedure it has been found, however, that on account of the very large mass of the mould carriers and also the low thermal capacity of air the heating takes a very long time. If an intermediate sterilization is necessary in which only the blow moulding machine is sterilized, this leads to a high production failure which is not tolerated by customers.

The object of the present invention is therefore to provide an apparatus and a method which, in particular, avoid high production failure in sterile applications of blow moulding machines, if a sterilization of the plant or parts of the plant respectively is necessary. This is attained according to the apparatus and method of the invention.

An apparatus according to the invention for the shaping of plastics material pre-forms into plastics material containers has at least one shaping station which in turn has a blow moulding device which forms a cavity, inside which the plastics material pre-forms are capable of being shaped into the plastics material containers by being acted upon with a gaseous medium. In this case the blow moulding device is constructed in several parts and has at least one first blow mould part and one second blow mould part and the shaping station has a blow mould carrier device for holding the blow mould parts. The blow mould carrier device has in this case a first carrier part and a second carrier part which are movable with respect to each other in order to open and close the blow moulding device. In addition, at least one coolant channel is provided which is used for conveying a flowable coolant for cooling the blow moulding device and/or the blow mould carrier device. In this case this coolant channel is integrated in a cooling circuit. In particular, the apparatus has a clean room inside which the plastics material pre-forms are conveyed during their shaping.

According to the invention the cooling circuit has at least one heating element capable of being switched on for heating the flowable cooling medium. As an alternative or in addition, it would also be possible for a heating circuit to be provided which, in particular, is used for heating the shaping station as a preparation for a sterilization procedure.

It is already known from the prior art for individual areas of the blow moulding device to be cooled or tempered generally during operation. For this purpose, coolant channels are provided which pass through blow mould carrier parts for example. Within the scope of the invention it is proposed that these coolant channels should also be used for heating internal surfaces of the apparatus, in particular for the purpose of sterilisation being capable of being carried out in an improved or more rapid manner.

In this context it is pointed out that the components or essential components of the blow moulding device respectively, such as for example the blow mould carriers and also the blow moulds have in each case very high masses and therefore require a relatively long warm-up time or heating time respectively. In addition, the apparatus can also have a temperature detection device which detects a temperature of at least one component of the blow moulding device, in particular during the heating thereof. The heating of the blow mould part can also be controlled on the basis of a temperature detection in this way. In addition, the apparatus can also have a further temperature detection device which detects further temperatures, such as for example an ambient temperature of the apparatus. Measurement values of this type can also be taken into consideration during the heating of the components.

It is advantageous for the heating element capable of being switched on to be designed in such a way that it allows a tempering of the blow moulding device and/or the blow mould carrier device or a surface of the blow moulding device and/or the blow mould carrier device respectively (and in particular the external surfaces of these devices) to at least 50° C.

In this case it would be possible for the aforesaid heating element to have the cooling medium constantly flow through it or around it respectively, but only for the heating element to be switched on (for example by having electric current flow through it) for the preparation of a sterilization procedure. It would also be possible, however, for the heating element not to have the cooling liquid flow through it or around it respectively in normal working operation of the apparatus, but for the flow of coolant (for example by switching on in a suitable manner with valves) to be rerouted in such a way that the liquid, in particular for the preparation of a sterilization procedure comes into contact with the heating element in order to be heated in this way.

In the case of a further advantageous embodiment the apparatus or the at least one shaping station respectively has a stretching rod which is capable of being introduced into the interior of the containers. The containers can be stretched in the longitudinal direction thereof by means of this stretching rod.

In the case of a further advantageous embodiment the apparatus has a stressing device in order to act upon the plastics material pre-forms with a flowable medium, and in particular with a gaseous medium, for example with compressed air (and in particular with sterile compressed air) for the shaping thereof. This can be a so-called blow moulding nozzle which is capable of being applied, in particular, to an aperture region of the plastics material pre-form in order to act upon it or the interior thereof respectively.

In the case of a further advantageous embodiment the shaping station also has a base part which is used for shaping out a base of the container to be produced. In this case this base part is also preferably arranged on a carrier device. It would also be possible for a coolant channel, through which the coolant specified above can flow, also to be arranged in this base part.

It is preferable for a cooling of the respective blow-mould carrier parts and with them preferably also a cooling of the blow mould parts to be carried out in working operation. In addition, it would be possible for the blow mould parts themselves to have channels in a corresponding manner through which a tempering medium, and in particular a cooling liquid, can flow.

In the case of a further embodiment the apparatus also has at least one cooling device for cooling the cooling liquid. In this case it is possible for a stationary cooling device to be provided. It would also be possible, however, for the cooling liquid to be taken directly from a water supply network since in some cases this cooling water is already at a suitable temperature.

In the case of a further advantageous embodiment a tempering device can be provided which is used for tempering the blow moulding device and/or the blow mould carrier device. This tempering device can also have, in addition to the heating element mentioned above, a control device, and, in addition, also a pump and/or a cooling water supply. In addition, the aforesaid cooling circuit can also have connecting lines in order to supply the cooling medium to the individual shaping stations. In the case of a further advantageous embodiment a control device of the cooling circuit is incorporated in a machine control means of the apparatus as a whole. In the case of a further advantageous embodiment the heating element and/or the control device is or are designed in such a way that the coolant is controlled at least for a time in such a way that the formation of condensation water can be reduced and preferably prevented.

In the case of a further advantageous embodiment the apparatus has a rotatable carrier on which a plurality of shaping stations are arranged. In this case it is possible for each individual one of these shaping stations to be supplied with the aforesaid coolant and/or also, in particular, to be capable of being supplied with the heated coolant in order to prepare for a sterilization operation.

In the case of a farther advantageous embodiment the at least one heating element is arranged on the aforesaid carrier. In this way, a direct heating of the cooling liquid is ultimately possible for the purpose of sterilization. It is preferable, however, for the heating element or the heating device respectively to be arranged in a stationary manner. In this case it is preferable for the heating element to be arranged directly upstream of a rotary distributor—which distributes the liquid to the individual shaping stations—in the flow direction of the cooling liquid. In addition, it would be possible for a plurality of heating devices of this type to be arranged one behind the other. Furthermore, it would also be possible for the heating element to be a so-called Peltier element which can cool or heat depending upon the switching. This Peltier element can likewise be used in normal operation of the apparatus for the (further cooling) of the liquid. The cooling liquid can be, in particular but not exclusively, water.

In general, it is proposed according to the invention that the heating means should be incorporated in the cooling circuit of the respective mould carrier or the blow mould carrier device respectively. In normal working operation this heating element is advantageously switched off in this case and the cooling water or the cooling liquid respectively is conveyed at a pre-set temperature, for example 10°, into the blow mould carrier devices. During a sterilization procedure and/or before the sterilization procedure this supply with cold liquid or cold water respectively is interrupted and/or the temperature of the cooling liquid is raised in a suitable manner with the aid of the heating element. On account of a tempering of this cooling liquid for example to 50° the mould carrier can be brought rapidly to a pre-set temperature, so that the heating phase as a whole can be shortened to a considerable degree. In particular, the heating phase of the apparatus according to the invention earn be reduced by preferably half the time, and particularly preferred by two thirds of the time as compared with the earlier time (as described in the prior art).

In the case of a further advantageous embodiment several heating elements are provided. In this case it is possible for each shaping station to have associated with it at least one heating element, as a result of which a very rapid heating of the cooling liquid is possible. It would also be possible, however, for a central heating element to be provided, for example arranged on the rotatable carrier which supplies the individual shaping stations. In addition, it would also be possible for a stationary heating device to be provided which likewise supplies all the shaping stations centrally with the now heated liquid or which heats the liquid respectively.

In the case of a further possible embodiment, however, each shaping station has associated with it at least one heating element. In addition, it would be possible for one heating element to be associated with several shaping stations.

In the case of a further advantageous embodiment the at least one heating element is an electrically operated heating element. In this way, an efficient heating of the cooling liquid can be achieved very quickly. It would also be possible, however, for the heating element to be a heat exchanger which is supplied with not water or steam from central generation plants. It is also possible to utilize waste heat from other processes.

In the case of a further advantageous embodiment the heating element is designed as a heating rod which is incorporated in the concerning cooling circuit. In this case this heating rod is—as mentioned above—preferably capable of being switched on. In the case of a further advantageous embodiment the at least one heating element is arranged in series with the coolant channel in a flow direction of the coolant. It is advantageous in this case for the heating element to be arranged upstream with respect to the respective shaping station and with respect to a coolant flow, so that a very direct and efficient heating is possible. It is advantageous for the at least one heating element also to be arranged upstream with respect to a distribution device, and in particular a rotary distributor which distributes the coolant to the individual shaping stations, in a flow direction of the flowable coolant.

In the case of a further advantageous embodiment at least areas or elements respectively of the coolant circuit are arranged stationary. In this way, for example a coolant reservoir can be provided, by means of which the individual shaping stations are supplied with coolant in working operation. In addition, it is advantageous for a distribution device to be provided which distributes the coolant to the individual shaping stations. This distribution device is advantageously a so-called rotary distributor.

In the case of a further advantageous embodiment the apparatus has at least one stressing device in order to act upon at least one area of the at least one shaping station with a flowable sterilization agent or sterilization medium respectively. This stressing device can be for example a nozzle which is preferably arranged stationary or movable. It would also be possible, however, for a blow moulding nozzle, which acts upon the plastics material pre-forms with blowing air in working operation, to be used as the stressing device. In this case this blow moulding nozzle can also be used for the distribution of the sterilization medium for the purpose of cleaning.

It is preferable for the blow moulding devices to have an inner surface which at least in sections forms a negative container shape of the container to be produced. In addition, it would be possible for a coupling device to be provided in order to couple parts of the blow mould wall to one another in order to form a closed state. It is advantageous in this case for a tempering agent to be provided at least in part at least in the region of a part of this blow mould wall in order to temper and, in particular, to cool the blow mould. In addition, it would also be possible for the heating element to be designed as a heating coil or the like.

In the case of a further preferred embodiment the apparatus has a clean room inside which the plastics material pre-forms are capable of being expanded to form the plastics material containers. It is advantageous for the blow moulding procedure to be carried out in this way inside the aforesaid clean room. In this case it would be possible for the complete apparatus to be incorporated into this clean room. In addition, it would also be possible for a complete plant, for example also including parts of the plant arranged upstream and downstream, to be incorporated into this clean room.

It is advantageous, however, for the clean room to be designed in the manner of a channel, or expressed more precisely, in the manner of a channel around the conveying path of the plastics material pre-forms to be expanded.

It is advantageous for at least one sealing device also to be provided which seals this clean room off from a (non-sterile) environment. This sealing device can be for example a so-called surge chamber in this case. This surge chamber can have in this case a continuous channel which is filled with a liquid and in which a portion of a further wall which bounds the clean room dips.

It is advantageous in this way for the apparatus to have at least one first wall which bounds the clean room and at least one second wall which bounds the clean room, wherein the first wall being designed movable, and in particular rotatable, with respect to the second wall.

The present invention further relates to a method of shaping plastics material pre-forms into plastics material containers, wherein the plastics material pre-forms are conveyed along a pre-set conveying path by means of a plurality of shaping stations and are expanded during this conveying to form the plastics material containers by being acted upon with a flowable, and in particular gaseous medium. In this case the shaping stations have in each case blow moulding devices and these blow moulding devices are cooled by the use of a cooling medium during a working operation of the apparatus.

According to the invention this tempering medium, and in particular cooling medium, is heated at least for a time by means of a heating device which is capable of being switched on.

It is advantageous for this tempering medium to be heated for the purpose of carrying out a sterilization procedure. Within the scope of the sterilization procedure it is advantageous for at least one element of the shaping station to be acted upon with a sterilization medium.

It is advantageous for this tempering medium to be heated in such a way that at least one element of the blow moulding device, such as for example a blow mould carrier device, tempered by this tempering medium, is heated to a temperature of at least 40°, preferably of at least 45°, and particularly preferred of at least 50°. It is advantageous for this tempering medium and/or the element through which this tempering medium flows to be heated over a period of time which is greater than 2 min, preferably greater than 5 min, preferably greater than 7 min, preferably greater than 10 min, and particularly preferred greater than 15 min.

In the case of a further advantageous embodiment the aforesaid coolant flows through elements of the shaping stations, and in particular of the blow mould carrier devices, during a working operation. In the case of a further preferred method an over-pressure is maintained inside this clean room with respect to an ambient pressure at least for a time, and preferably completely, during a working operation. It is preferable for this over-pressure also to be maintained during a sterilization procedure.

In the case of a further preferred method the shaping procedure of the plastics material pre-forms into the plastics material containers takes place inside a clean room. It is advantageous in this case for this clean room to be sealed off from a (non-sterile) environment by means of at least one sealing device.

It is preferable for the individual blow moulding devices of the apparatus to be opened and closed during the working operation by pivoting procedures of blow mould carrier parts on which blow mould parts [are] arranged.

In the case of a further advantageous method the heating of the coolant and the sterilization of the elements of the shaping stations take place within the scope of an intermediate sterilization procedure. In particular in this case, an intermediate sterilization of blow moulding machines takes place inside a clean room. An intermediate sterilization procedure of this type can be carried out for example when the individual blow moulding devices are changed, for example if a change-over between two different containers to be produced is to take place. In addition, it is also possible, however, for an intermediate sterilization procedure of this type to be carried out after pre-set periods of time in order to achieve a pre-set degree of cleanness. It is advantageous, however, for the production, i.e. the manufacture of plastics material containers, to be interrupted for the implementation of an intermediate sterilization procedure.

It is therefore advantageous for clean room conditions to be maintained at least for a time during the performance of the (intermediate) sterilization procedure. It is advantageous in this case for a cooling of the coolant-first to be switched off and for the heating element to be switched on. In addition, it would also be possible for a temperature or the surfaces to be sterilized to be measured at least once, in particular before a sterilization agent is applied to them.

It is advantageous for the apparatus described above to have a temperature measurement device which, in particular, also determines the temperatures of the surfaces to be sterilized. It is advantageous in this case for the heating element described to be controlled on the basis of temperatures measured with this temperature measurement device. In this case it would be possible for a temperature measurement device of this type to be arranged in a stationary manner and for the temperatures of the individual blow mould parts to be determined (in particular without contact) during a rotational movement of the carrier. In addition, the stressing of the surfaces with the sterilization medium can be carried out in a manner dependent upon a temperature of the surfaces to be acted upon.

Further advantages and embodiments are evident from the accompanying drawings. In the drawings

Figure 1:
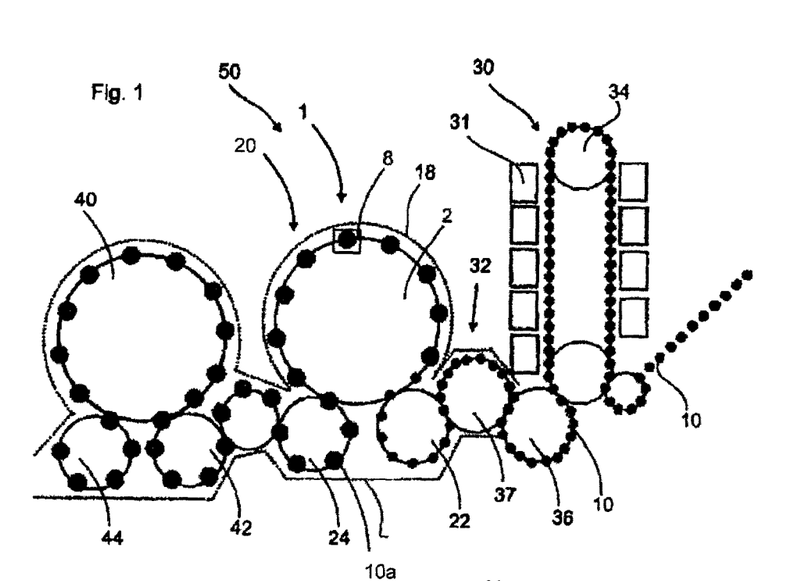
FIG. 1 is a diagrammatic illustration of a plant for the production of plastics material containers.

FIG. 1 is a diagrammatic illustration of a plant for the production of plastics material containers according to the prior art. This plant 50 has a heating device 30 in which plastics material pre-forms 10 are heated. In this case these plastics material pre-forms 10 are conveyed through this heating device 30 by means of a conveying device 34, such as a circulating chain in this case, and are heated in this case by a plurality of heating elements 31. This heating device 30 is adjoined by a transfer unit 36 which transfers the pre-forms 10 to a sterilization device 32. This sterilization device 32 likewise has in this case a conveying wheel 37 and sterilisation elements can be arranged on this conveying wheel 37 or even in a stationary manner. In this region for example a sterilization by hydrogen peroxide gas or even by electromagnetic radiation is possible. In particular an internal sterilization of the pre-forms is carried out in this region.

The reference number 20 designates a clean room as a whole, which external dimensions are indicated in this case by the dotted line L. In a further preferred embodiment the clean room 20 is arranged not only in the region of the conveying wheel 2 and the filling device 40, but if possible it starts already in the region of the heating device 30, the sterilization device 32, the supply of the plastics material pre-forms and/or the production of the plastics material pre-forms. It is evident that this clean room 20 starts in the region of the sterilization unit 32. Lock devices can be provided in this region in order to introduce the plastics material pre-forms into the clean room 20 without too much gas flowing inside the clean room in this case and thus being lost.

As indicated by the broken line L, the clean room is adapted to the external shape of the individual components of the plant. In this way, the volume of the clean room can be reduced.

The reference number 1 designates a shaping device as a whole, in which a plurality of blow moulding stations or shaping stations 8 respectively are arranged on a conveying wheel 2, wherein in this case only one of these blow moulding stations 8 is illustrated. The plastics material pre-forms 10 are expanded by these blow moulding stations 8 to form containers 10a. Although it is not shown in detail here, the entire area of the conveying device 2 is not present inside the clean room. 20, but the clean room 20 or isolator respectively is implemented as it were in the form of a mini-isolator inside the apparatus as a whole. In this way, it would be possible for the clean room to be designed in the manner of a channel at least in the region of the shaping device 1.

The reference number 22 refers to a supply device which transfers the pre-forms to the shaping device 1 and the reference number 24 refers to a discharge device which discharges the manufactured plastics material containers 10a from the shaping device 1. It is evident that in the region of the supply device 22 and the discharge device 24 the clean room 20 has recesses in each case which receive these devices 22, 24. In this way, a transfer of the plastics material pre-forms 10 to the shaping device 1 and a taking-on of the plastics material containers 10a from the shaping device 1 can be carried out in a particularly advantageous manner.

The expanded plastics material containers are transferred by a transfer unit 42 to a filling device 40 and are then discharged from this filling device 40 by way of a further conveying unit 44. In this case the filling device 40 is also situated inside the aforesaid clean room 20. In addition, in the case of the filling device it would be possible for the entire filling device 40 with for example a reservoir for a beverage not to be situated completely inside the clean room, but also here only those areas in which the containers are in fact conveyed. In this respect it would also be possible for the filling device to be designed in a similar manner to the apparatus 1 for the shaping of plastics material pre-forms 10.

As mentioned, the clean room 20 is reduced in the region of the apparatus 1 to a smallest possible area, namely substantially to the blow moulding stations 8 themselves. On account of this compact design of the clean room 20 it is possible in an easier and more rapid manner to produce a clean room in any case, and, in addition, the rendering sterile in the operating phase is less complex. In addition, less sterile air is required, and this leads to smaller filter plants and also the risk of uncontrolled swirl formation is reduced.

Figure 2:
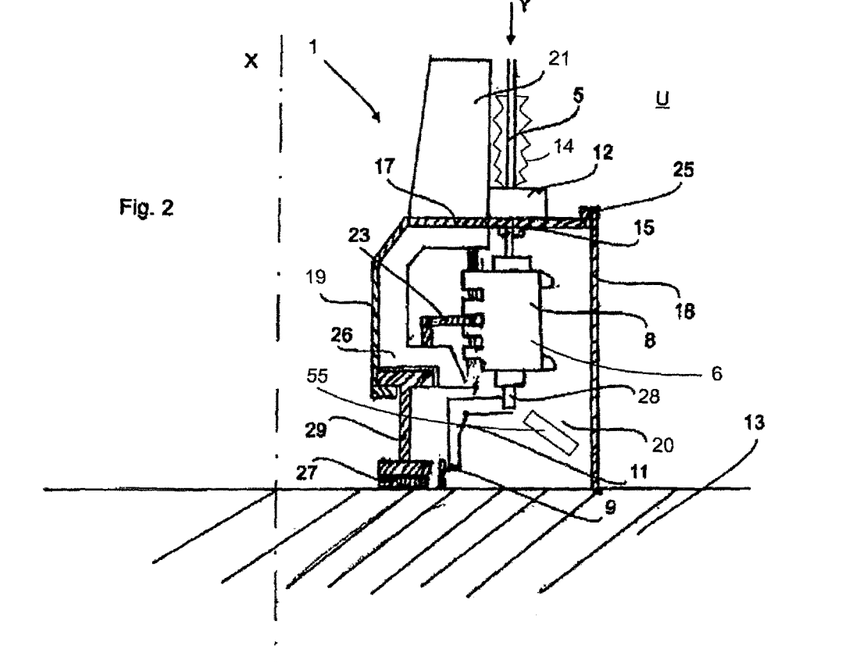
FIG. 2 is a view of a clean room in the region of a blow moulding station.

FIG. 2 is a detailed illustration of the apparatus 1 according to the prior art in the region of a blow moulding station 8. A plurality of blow moulding stations 8 of this type are moved in a rotary manner about an axis X by a conveying device 2 or a carrier respectively. As is evident from FIG. 2, the blow moulding station 8 is conveyed inside the clean room 20 which in this case is designed in the manner of a channel. This clean room 20 is closed off by a movable lateral wall 19 and a cover 17 formed in one piece with this lateral wall 19. This lateral wall 19 and the cover 17 rotate jointly with the blow moulding station 8 in this case.

The reference number 18 refers to a further wall which bounds the clean room 20. This wall 18 is in this case a wall which is situated on the outside and which is arranged stationary. A sealing device 25, which seals off the cover 17 and the wall 18 from each other for example, as mentioned above, with the use of a surge chamber, is provided between the elements 17 and 18 which are movable with respect to each other. The lower region of the wall 18 is arranged on a base 13 in a fixed and sealed manner. A carrier 26, which likewise moves in a rotating manner and on which in turn a holding device 23 is provided which holds the blow moulding station 8, is provided inside the clean room 20 and resting directly against the wall 19 in this case.

The reference number 11 refers to a follower device which can be actuated by a guide cam 9 in order to open and to close the blow moulding station on its path through the clean room 20 in order, in particular, to introduce the plastics material pre-form into the blow moulding station and also to remove it again. In this case a guide cam 9 is also arranged inside the clean room 20. It would also be possible, however, for example to bring a portion 11 below the individual blow moulding stations 8 out of the clean room 20.

The conveying device 2 can also have further elements which are arranged above the clean room 20.

The carrier 26 is arranged in this case on a holding body 29 in a fixed manner and this holding body in turn is movable with respect to the base 13. In this case the reference number 27 refers to a further sealing device which in this region also produces a sealing of the areas 13 and 29 which are movable with respect to each other.

The reference number 5 refers to a stretching rod which is movable with respect to the blow moulding station in order to stretch the plastics material pre-forms 10 in the longitudinal direction thereof. In this case the cover 17 has arranged on it a slide 12 with respect to which the stretching rod is movable in the direction Y. The reference number 21 refers to a further holding means for this slide 12 of the stretching rod 5.

It will be seen that specific regions of the stretching rod are both outside the clean room 20 and inside the clean room 20 during the blow moulding procedure. For this purpose it is possible for a protective device such as a folding bellows 14, which surrounds the stretching rod 5 so that no region of the stretching rod 5 comes directly into contact with the external environment, to be provided outside the clean room 20 or above the slide 12 respectively. The reference letter U designates the (non-sterile) environment of the clean room 20. The reference number 28 designates a carrier for carrying a base mould which likewise constitutes a component part of the blow mould. This carrier is likewise movable in the direction Y in this case.

The reference number 55 refers to a sterilization device which in this case is preferably arranged in the interior of the clean room 20 and serves to sterilize the individual shaping stations or component parts of these shaping stations 8 respectively. This sterilization device 55 can in this case act upon the shaping stations 8 for example with hydrogen peroxide or another sterilization agent. In this case the sterilization device 55 can be arranged stationary and the shaping stations can move with respect to this sterilization device 55. This sterilization device or stressing device 55 respectively can be situated on the conveying wheel 2 or on the standing wall 18 or can be arranged stationary in general and can comprise nozzles or the like. In addition, it is advantageous for sterile air to be introduced into the clean room 20 by way of the aeration system in order to sterilize the clean room 20.

The blow moulds (not shown) are arranged inside the blow mould carriers 6. In more precise terms, two blow mould carrier parts which are pivotable with respect to each other and in each case hold a blow mould part can be provided in this case. The blow moulds can be opened by this pivoting procedure for the introduction of plastics material pre-forms and for the removal of finished blow moulded containers. These blow mould carriers and blow moulds are likewise arranged inside the clean room in this case.

It would also, however, be possible and preferable (other than as shown in FIG. 2) for the conveying device 2 or the carrier respectively to have a C-shaped external periphery which also in part forms the outer walls of the clean room. In this way, this C-shaped wall of the clean room rotates with the conveying device 2, i.e. the blow moulding wheel. In the case of this embodiment the lower boundary of the clean room is arranged at a distance from the base 13 and moves relative to the base. In this way, the clean room can be made still smaller than as shown in FIG. 2. This C-shaped profile of the conveying device, which in this case forms both an inner wall and a lower and upper cover of the clean room, is preferably sealed off only with respect to the outer wall of the clean room in this case. This outer wall is advantageously arranged stationary in this case.

Figure 3:
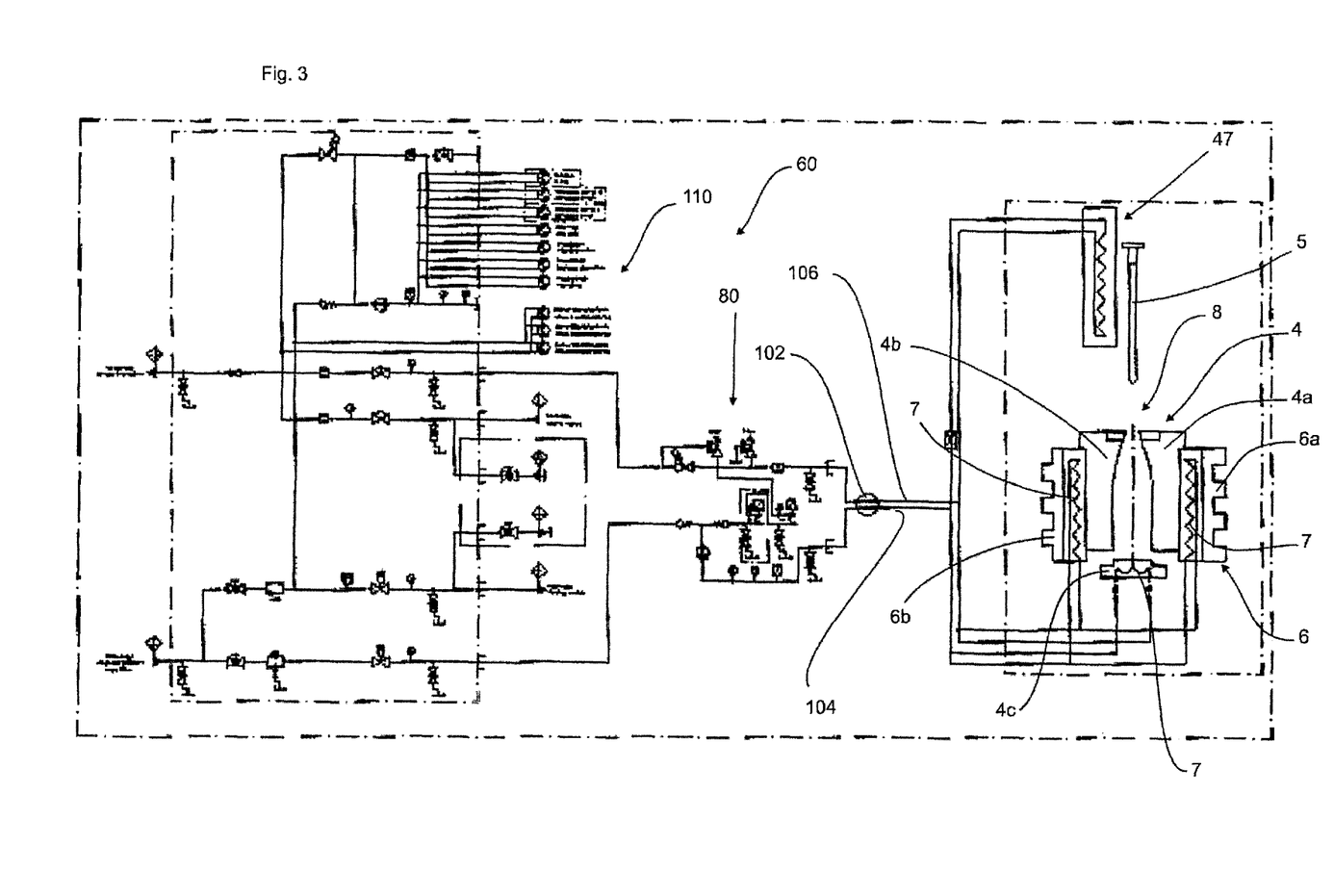
FIG. 3 is a diagram of an apparatus according to the invention.

FIG. 3 is a diagrammatic illustration of an apparatus according to the invention. In this case the shaping station 8 is again shown which here has a blow moulding device 4. This blow moulding device is formed from two lateral parts 4a and 4b as well as from a base part 4c. The three elements together form the cavity inside which the plastics material pre-forms are expanded to form the plastics material containers. The blow moulding device is preferably arranged at least in part inside a clean room.

The reference number 6 designates a blow mould carrier device as a whole. This likewise has two blow mould carrier parts 6a and 6b, which are pivotable with respect to a vertical pivot axis in order to open and to close the blow moulding device. In this way, the pivot axis of the two blow mould carrier devices is parallel to an axis of rotation X of the carrier shown in FIG. 1. It will be seen that both the two lateral parts 4a and 4b as well as the base part 4c of the blow moulding device are tempered. For this purpose coolant lines or coolant channels 7 respectively extend in each case through these elements. These coolant channels thus have the now heated medium flow through them in order to prepare for a sterilization process.

The reference number 60 designates the cooling circuit as a whole, which is used for cooling the parts of the shaping stations. The heating element or the heating device respectively is incorporated in this cooling circuit, as described in greater detail below. In this case it is additionally possible for further flow paths of the cooling liquid also to be changed, for example by valves, when the heating element is switched on. In this way, it is possible for example for the warm liquid to be kept away from certain regions of the cooling circuit, for example from a reservoir for the cooling liquid.

The reference number 110 refers to a supply unit (not shown in detail) for supplying a coolant. The reference number 102 designates a rotary distributor which distributes the coolant to the elements specified above. To this end a supply line 104 and also a return line 106 are provided. The reference number 80 designates a heating device or the heating element respectively as a whole, which is capable of being switched on and off in order to heat the coolant. Starting from this heating device 80 the coolant is distributed to the individual shaping stations 8 by way of the aforesaid rotary distributor 102.

The reference number 47 designates a cooling device by which a further region of the apparatus, for example the drive of the stretching rod 5, can be cooled.

Starting from the supply line 104 the coolant is distributed to the aforesaid elements during the working operation. If a sterilisation operation is now carried out, the heating element or warming element 80 respectively is switched on and in this way the coolant used in working operation is heated intensively. In this way, the blow mould carrier parts 6a and 6b can be heated so intensively that after that the sterilization medium reaching them no longer condenses.

The Applicants reserve the right to claim all the features disclosed in the application documents as being essential to the invention, insofar as they are novel either individually or in combination as compared with the prior art.

LIST OF REFERENCES 1 shaping device
2 conveying wheel
4 blow mould
4a, 4b blow mould parts
4c base
5 stretching rod
6 blow mould carrier
6a, 6b blow mould carrier parts
7 Coolant channel
8 blow moulding/shaping stations
9 guide cam
10 plastics material pre-forms
10a containers
11 follower device
12 slide
13 base
14 folding bellows
17 cover
18 further wall
19 lateral wall
20 clean room
21 holding means for the slide
22 supply device
23 holding device
24 discharge device 25 sealing device
26 carrier
27 further sealing device
28 carrier for carrying a base mould
29 holding body
30 heating device
31 heating elements
32 sterilization device
34 conveying device
34 transfer unit
37 conveying wheel
40 filling device
42 transfer unit
44 conveying unit
47 cooling device
50 plant for the production of plastics material containers
55 sterilization device
60 cooling circuit
80 heating device, heating element
102 rotary distributor
104 supply line
106 return line
110 supply unit
U non-sterile environment
X axis of rotation of the carrier
Y supply direction of the stretching rod
L clean room boundary

The invention claimed is:

1. An apparatus (1) for the shaping of plastics material pre-forms (10) into plastics material containers (10a), with at least one shaping station (8) which has a blow moulding device (4) which forms a cavity, inside which the plastics material pre-forms (10) are capable of being shaped into the plastics material containers (10a) by being acted upon with a gaseous medium, wherein the blow moulding device (4) is constructed in several parts and has at least one first blow mould part (4a) and one second blow mould part (4b), and wherein the shaping station (8) has a blow mould carrier device (6) for holding the blow mould parts (4a, 4b), wherein the blow mould carrier device (6) has a first carrier part (6a) and a second carrier part (6b) which are movable with respect to each other in order to open and close the blow moulding device (4), and wherein at least one coolant channel (7) is provided which is used for conveying a flowable coolant for cooling the blow moulding device (4) and/or the blow mould carrier device (6), wherein this coolant channel (7) is integrated in a cooling circuit (60), wherein the apparatus (1) has a clean room (20) inside which the plastics material pre-forms (10) are capable of being expanded to form the plastics material containers (10a), wherein the cooling circuit (60) has at least one heating element (80) capable of being switched on during a sterilization process for heating the flowable coolant, wherein there are more than one of the heating elements, and wherein the heating elements are arranged one behind the other.

2. An apparatus (1) according to claim 1, wherein the apparatus (1) has a rotatable carrier (2) on which a plurality of shaping stations (8) are arranged.

3. An apparatus (1) according to claim 2, wherein the at least one heating element (80) is arranged stationary.

4. An apparatus (1) according to claim 1, wherein several heating elements (80) are provided.

5. An apparatus (1) according to claim 4, wherein each shaping station (8) has associated with it at least one heating element (80).

6. An apparatus (1) according to claim 1, wherein the at least one heating element (80) is an electrically operated heating element (80).

7. An apparatus (1) according to claim 1, wherein the at least one heating element (80) is arranged in series with the coolant channel in a flow direction of the coolant.

8. An apparatus (1) according to claim 1, wherein the apparatus (1) has at least one stressing device (55) in order to act upon at least one area of the at least one shaping station (8) with a flowable sterilization medium.

9. An apparatus (1) according to claim 1, wherein the at least one heating element (80) is arranged upstream of a distribution device, which distributes the coolant to several shaping stations, in a flow direction of the flowable coolant.

10. A method of shaping plastics material pre-forms (10) into plastics material containers (10a), wherein the plastics material pre-forms (10) are conveyed along a pre-set conveying path by means of a plurality of shaping stations (8), each of which has a blow moulding device (4) which forms a cavity, inside which the plastics material pre-forms (10) are capable of being shaped into the plastics material containers (10a) by being acted upon with a gaseous medium, wherein the blow moulding device (4) is constructed in several parts and has at least one first blow mould part (4a) and one second blow mould part (4b), and wherein the shaping station (8) has a blow mould carrier device (6) for holding the blow mould parts (4a, 4b), wherein the blow mould carrier device (6) has a first carrier part (6a) and a second carrier part (6b) which are movable with respect to each other in order to open and close the blow moulding device (4), and wherein at least one coolant channel (7) is provided which is used for conveying a flowable coolant for cooling the blow moulding device (4) and/or the blow mould carrier device (6), wherein this coolant channel (7) is integrated in a cooling circuit (60), wherein the apparatus (1) has a clean room (20) inside which the plastics material pre-forms (10) are capable of being expanded to form the plastics material containers (10a), wherein the cooling circuit (60) has at least one heating element (80) capable of being switched on for heating the flowable coolant, wherein the at least one heating element (80) is arranged upstream of a distribution device, which distributes the coolant to several shaping stations, in a flow direction of the flowable coolant, and wherein the plastics material pre-forms (10) are expanded during this conveying to form the plastics material containers (10a) by being acted upon with the flowable medium, wherein the blow moulding devices (4) are cooled by the use of the cooling medium during a working operation of the apparatus, wherein the cooling medium is heated at least for a time by means of the heating device (80).

11. A method according to claim 10, wherein after the heating of the cooling medium at least one element of at least one shaping station (8) is acted upon with a sterilization medium.

12. An apparatus (1) for the shaping of plastics material pre-forms (10) into plastics material containers (10a), with at least one shaping station (8) which has a blow moulding device (4) which forms a cavity, inside which the plastics material pre-forms (10) are capable of being shaped into the plastics material containers (10a) by being acted upon with a gaseous medium, wherein the blow moulding device (4) is constructed in several parts and has at least one first blow mould part (4a) and one second blow mould part (4b), and wherein the shaping station (8) has a blow mould carrier device (6) for holding the blow mould parts (4a, 4b), wherein the blow mould carrier device (6) has a first carrier part (6a)

and a second carrier part (6*b*) which are movable with respect to each other in order to open and close the blow moulding device (4), and wherein at least one coolant channel (7) is provided which is used for conveying a flowable coolant for cooling the blow moulding device (4) and/or the blow mould carrier device (6), wherein this coolant channel (7) is integrated in a cooling circuit (60), wherein the apparatus (1) has a clean room (20) inside which the plastics material pre-forms (10) are capable of being expanded to form the plastics material containers (10*a*), wherein the cooling circuit (60) has at least one heating element (80) capable of being switched on for heating the flowable coolant,     wherein the at least one heating element (80) is arranged upstream of a distribution device, which distributes the coolant to several shaping stations, in a flow direction of the flowable coolant.

13. The apparatus of claim 1, wherein the apparatus is configured such that the heating element is switched off during normal working operation.

14. The apparatus of claim 1, wherein the apparatus is configured such that during sterilization, the flow of flowable coolant is interrupted.

15. The apparatus of claim 1, wherein the heating element is a heating rod.

16. The apparatus of claim 1, wherein the apparatus is configured such that the flowable coolant constantly flows through or around the heating element, and the heating element is only switched on during sterilization.

17. The apparatus of claim 1, further comprising:
    valves for routing the flowable coolant so as to control the contact of the flowable coolant with the heating element,
    wherein the apparatus is configured such that the flowable coolant does not contact the heating element during normal working operation, and the flowable coolant contacts the heating element during the sterilization process.

18. The apparatus of claim 1, wherein the heating element is arranged on the blow mould carrier device.

19. The apparatus of claim 1, wherein there are more than one of the shaping stations, the apparatus further comprising:
    a rotary distributor for distributing the flowable coolant to the shaping stations; and
    wherein the heating element is arranged directly upstream of the rotary distributor in the flow direction of the flowable coolant.

20. The apparatus of claim 1, wherein the heating element is a Peltier element and is capable of being switched to heat or to cool.

\* \* \* \* \*